United States Patent
Nicoara et al.

(10) Patent No.: US 12,199,262 B2
(45) Date of Patent: Jan. 14, 2025

(54) BATTERY PASTE HOPPER AND TOOLING

(71) Applicant: Wirtz Manufacturing Company, Inc., Port Huron, MI (US)

(72) Inventors: Sergiu Nicoara, Port Huron, MI (US); Scott A. Mercurio, Clyde Township, MI (US)

(73) Assignee: Wirtz Manufacturing Company, Inc., Port Huron, MI (US)

( * ) Notice: Subject to any disclaimer, the term of this patent is extended or adjusted under 35 U.S.C. 154(b) by 0 days.

(21) Appl. No.: 18/590,093

(22) Filed: Feb. 28, 2024

(65) Prior Publication Data

US 2024/0204161 A1 Jun. 20, 2024

Related U.S. Application Data

(63) Continuation of application No. 17/677,246, filed on Feb. 22, 2022, now Pat. No. 11,949,086.

(60) Provisional application No. 63/151,125, filed on Feb. 19, 2021.

(51) Int. Cl.
| | |
|---|---|
| *H01M 4/04* | (2006.01) |
| *B05C 5/00* | (2006.01) |
| *B05C 11/02* | (2006.01) |
| *B05C 11/10* | (2006.01) |
| *H01M 4/20* | (2006.01) |
| *H01M 10/04* | (2006.01) |
| *H01M 4/73* | (2006.01) |

(52) U.S. Cl.
CPC .......... *H01M 4/0402* (2013.01); *B05C 5/004* (2013.01); *B05C 11/025* (2013.01); *B05C 11/10* (2013.01); *H01M 4/20* (2013.01); *H01M 10/0404* (2013.01); *H01M 4/73* (2013.01)

(58) Field of Classification Search
CPC ........ H01M 4/04; H01M 4/0402; H01M 4/20; H01M 4/73; H01M 10/0404; B05C 5/004; B05C 5/00; B05C 11/025; B05C 11/10
See application file for complete search history.

(56) References Cited

U.S. PATENT DOCUMENTS

| | | |
|---|---|---|
| 2,680,547 A | 6/1954 | Donath |
| 3,486,942 A | 12/1969 | Hatterschide |
| 3,554,726 A | 1/1971 | Daly |

(Continued)

OTHER PUBLICATIONS

International Preliminary Report on Patentability for International Application No. PCT/US2022/017260 dated Aug. 22, 2023 (14 pages).

(Continued)

*Primary Examiner* — Nicolas A Arnett
(74) *Attorney, Agent, or Firm* — REISING ETHINGTON, P.C.

(57) ABSTRACT

A battery paste application tooling assembly includes a hopper, a connector assembly, and a clamp assembly. The battery paste application tooling assembly can be equipped in a pasting machine. The hopper receives battery paste material. The hopper has an orifice plate with an orifice therein. The connector assembly is engageable with the orifice plate and disengageable therefrom. The clamp assembly is movable between a first position and a second position. In the first position, the clamp assembly releasable secures the orifice plate to the hopper. In the second position, the clamp assembly permits removal of the orifice plate from the hopper.

15 Claims, 7 Drawing Sheets

(56) References Cited

U.S. PATENT DOCUMENTS

| | | | |
|---|---|---|---|
| 3,894,886 | A | 7/1975 | Pankow et al. |
| 4,606,383 | A | 8/1986 | Yanik |
| 4,932,443 | A | 6/1990 | Karolek et al. |
| 5,467,805 | A | 11/1995 | Farina |
| 6,533,862 | B2 | 3/2003 | Kokaji et al. |
| 8,272,408 | B2 | 9/2012 | Fredrickson |
| 9,397,331 | B2 | 7/2016 | Mendoza et al. |
| 9,437,867 | B2 | 9/2016 | Mendoza et al. |
| 9,744,552 | B2 | 8/2017 | Mendoza et al. |
| 10,232,453 | B2 | 3/2019 | Mendoza et al. |
| 10,388,942 | B2 | 8/2019 | Fredrickson |
| 11,949,086 | B2 * | 4/2024 | Nicoara ............ H01M 10/0404 |
| 2016/0288154 | A1 | 10/2016 | Mendoza et al. |
| 2021/0031261 | A1 | 2/2021 | Wirtz, II et al. |
| 2021/0194090 | A1 | 6/2021 | Wood et al. |

OTHER PUBLICATIONS

International Search Report and Written Opinion for International Application No. PCT/US2022/017260 dated May 12, 2022 (22 pages).

* cited by examiner

US 12,199,262 B2

BATTERY PASTE HOPPER AND TOOLING

CROSS-REFERENCE TO RELATED APPLICATION

This application is a continuation of U.S. patent application Ser. No. 17/677,246, with a filing date of Feb. 22, 2022, the contents of which are hereby incorporated by reference in their entirety.

TECHNICAL FIELD

This disclosure relates generally to the application of battery paste material to a grid or electrode for a battery and, more particularly, to a paste hopper and tooling of a machine for applying battery paste to a grid or electrode for a battery amid battery manufacture.

BACKGROUND

Various machines for and methods of applying a viscous battery paste material to a grid or electrode for a battery are known. Some of these machines have a hopper in which battery paste material is received and applied through an orifice of a plate attached to the hopper and to a grid or electrode as it passes under the orifice plate. The orifice plate is removably attached in a fixed position on the hopper by many cap screws, bolts, or other fasteners extending through the orifice plate and threaded into the hopper. Usually, a different orifice plate having a different configuration is required for pasting each grid or electrode having a different configuration or construction. When using a pasting machine with a paste hopper, the orifice plate must be removed periodically for cleaning it and/or cleaning the paste hopper, and then subsequently reinstalled or a different orifice plate installed for pasting grids or electrodes having a different configuration or construction. The removal and reinstalling of an orifice plate or installing another different orifice plate usually takes about 20 to 30 minutes during which period of time the pasting machine cannot be used to paste grids or electrodes. In a commercial production setting of such a pasting machine, the orifice plate is typically removed for cleaning it and/or cleaning the hopper about every 4 to 5 hours of otherwise continuous operation of the pasting machine. Typically, this is a significant loss of production when pasting a series of grids or electrodes having the same configuration and or when changing to an orifice plate with a different configuration for a production run of pasting grids or electrodes with a different configuration. One such type of pasting machine is shown in U.S. Pat. No. 9,437,867 assigned to the applicant hereof, and the disclosure of which is incorporated herein by reference.

SUMMARY

In an embodiment, a battery paste application tooling assembly may include a hopper, a connector, and a clamp. The hopper receives battery paste material. The hopper has an orifice plate with an orifice for dispensing battery paste material from the hopper. The connector is in part or more carried by the hopper. The connector can be engaged with the orifice plate and can be disengaged from the orifice plate. The connector has one or more shafts and one or more brackets. The bracket(s) can be engaged with and can be rotated about the shaft(s), and can be disengaged from the shaft(s). The clamp is in part or more carried by the hopper. The clamp can be moved to a first position and to a second position. In the first position, the clamp releasably secures the orifice plate in engagement with the hopper and the connector. In the second position, the clamp permits disengagement and removal of the orifice plate from the clamp, connector, and hopper. The clamp has one or more fingers that urge the orifice plate into engagement with the connector and with the hopper when the clamp is in the first position, and disengaged from the orifice plate when the clamp is in the second position.

BRIEF DESCRIPTION OF THE DRAWINGS

The following detailed description of certain embodiments and best mode will be set forth with reference to the accompanying drawings in which.

DETAILED DESCRIPTION

Figure 1:
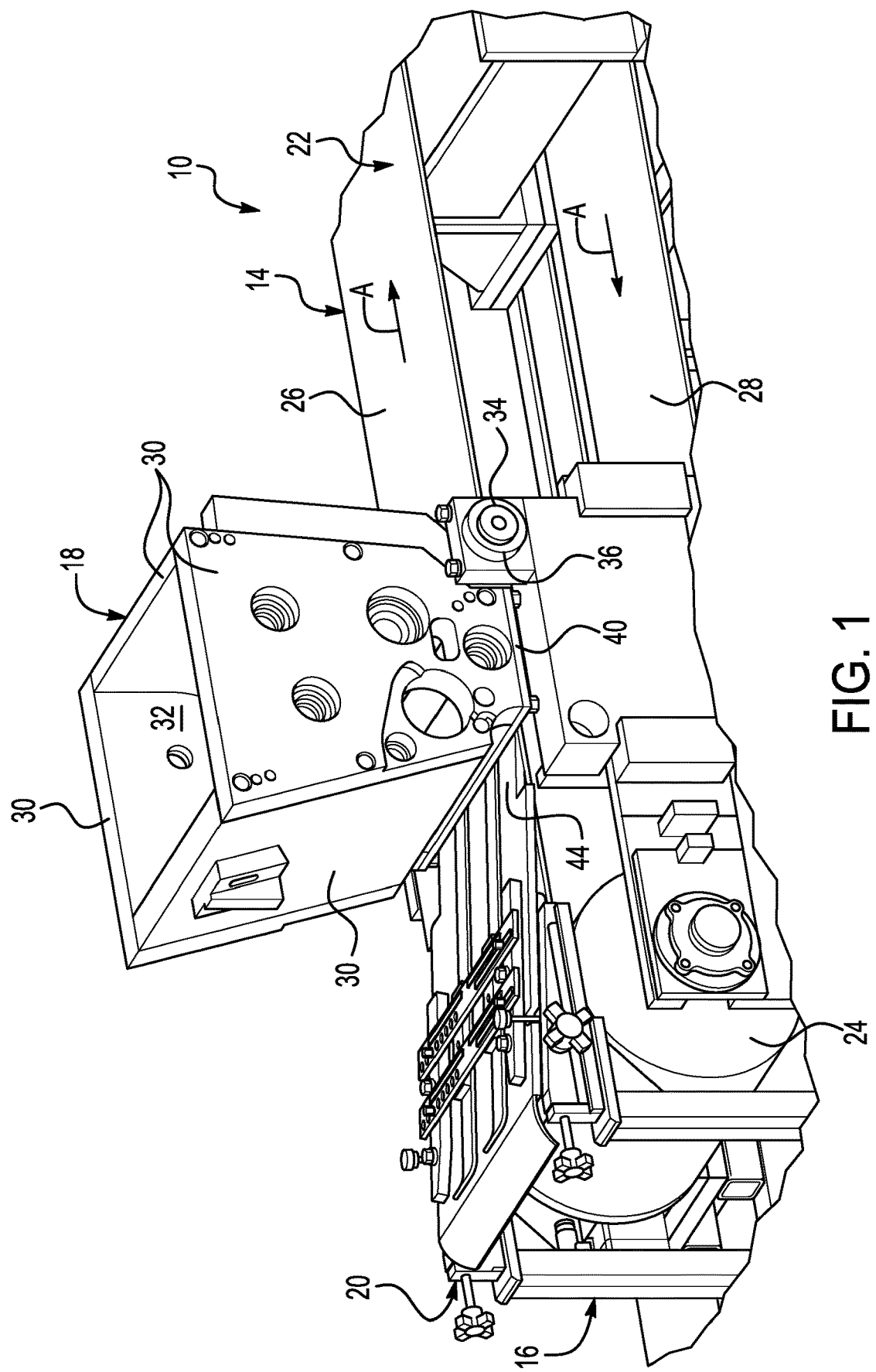
FIG. 1 is a partial perspective view of an embodiment of a battery grid or electrode pasting machine.

Referring in more detail to the drawings, FIG. 1 illustrates a pasting machine 10 that in operation applies electrochemically active battery paste material to a strip of a plurality of serially connected battery electrodes or grids (which hereinafter may be collectively referred to as grids or battery grids). The strip of grids may be conveyed by a belt 14 under a paste hopper 18 which applies the battery paste material to them. The belt 14 may convey the strip of grids from an entry end 20 to an exit end 22 of the pasting machine 10. The belt 14 may be received on one or more rollers 24 driven by an electric motor to move the belt 14, and the rollers 24 may also keep the belt taut. The arrows A in FIG. 1 represent the movement of the belt 14 along an upper run 26 and a lower run 28 of the belt 14. Different types and widths of belts can be used including a single width endless or circumferentially continuous belt as shown, and the belts can be composed of different materials including stainless steel, plastic, felt, rubber or various woven materials, according to different embodiments.

The paste hopper 18 may be supported by a frame 16 vertically above and overlying the upper run 26 of the belt 14 and is constructed to receive and contain battery paste material and dispense it through an orifice of an orifice plate 40 onto the strip of grids as it passes under the paste hopper 18. The paste hopper 18 may have four walls 30 that define an interior 32 to receive the battery paste material. To keep the battery paste material in a mixed state and to be more readily dispensed, the paste hopper 18 may include several feed rollers and paddles which may be driven by a suitable electric motor. The paste hopper 18 may be pivotally mounted adjacent its downstream end by a shaft 34 journaled adjacent each end in a bearing 36 so that the orifice plate 40 and the bottom of the paste hopper 18 may be pivotally moved or swung away from the belt 14.

Figure 2:
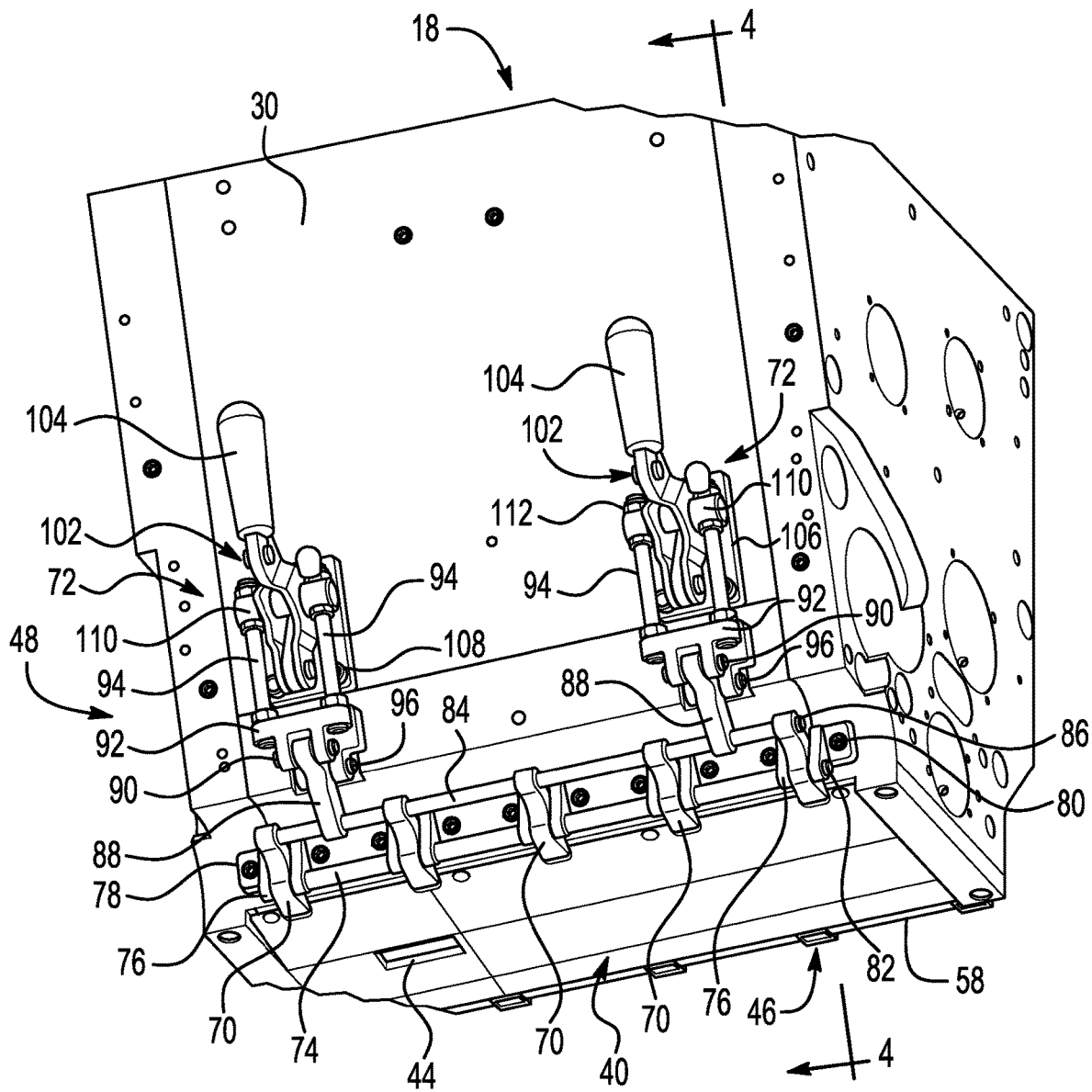
FIG. 2 is a perspective view of a paste hopper with an orifice plate and attachment mechanism according to an embodiment.
Figure 3:
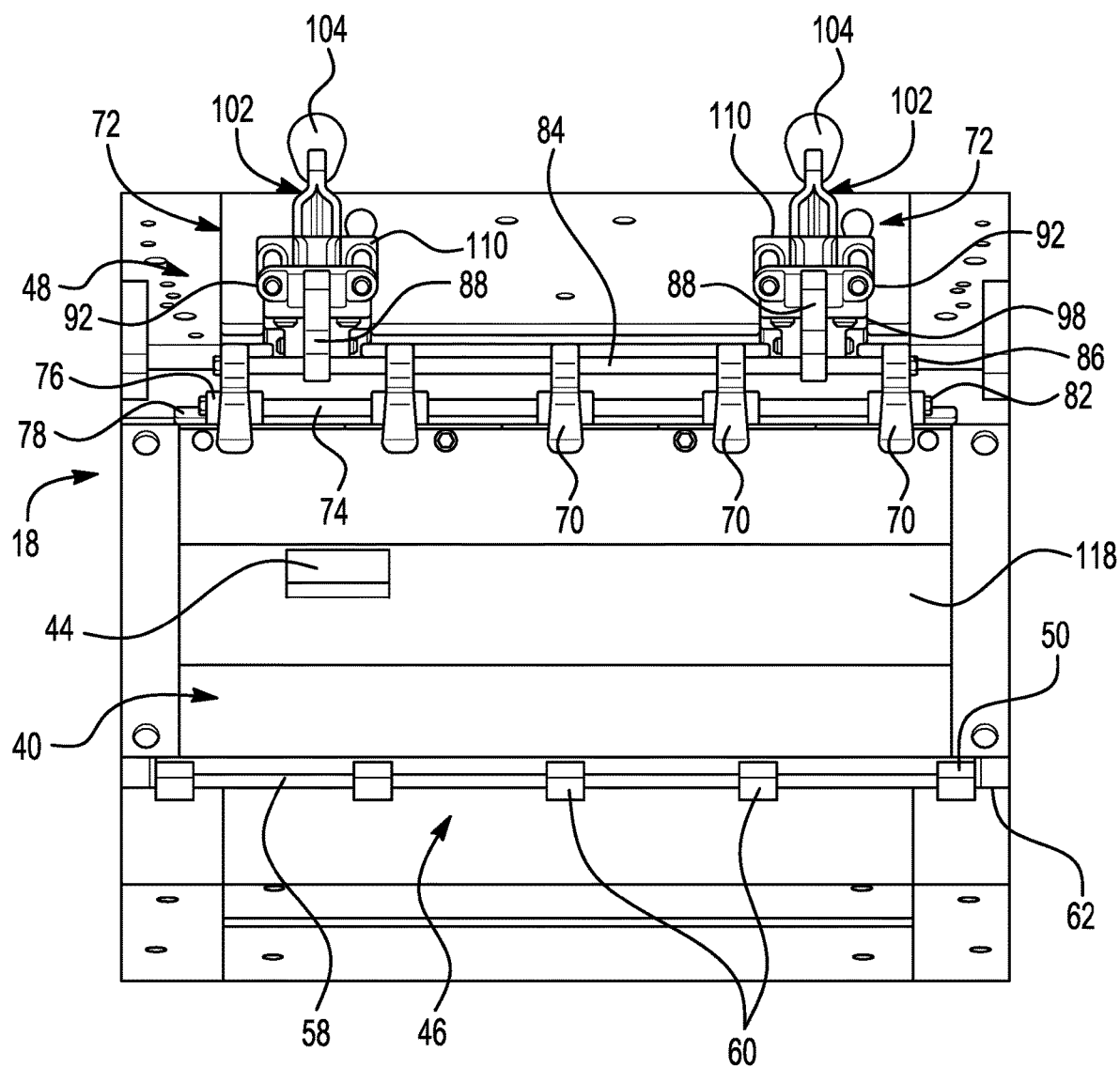
FIG. 3 is a bottom view of the orifice plate and paste hopper of FIG. 2.

As shown in FIGS. 2 and 3, the orifice plate 40 may be precisely located and removeably retained on and over an open bottom portion 42 (FIG. 5) of the paste hopper 18, for dispensing paste material through an orifice opening 44, by a connector assembly 46 adjacent one end and by a clamp assembly 48 adjacent the other end. This enables both the installation on, and removal from, the paste hopper 18 of the orifice plate 40 by hand and without using any tools. The connector assembly 46 is adjacent to the downstream end of the orifice plate 40 and the clamp assembly 48 is adjacent the upstream end of the orifice plate 40 relative to the direction of movement of the strip of grids relative to the orifice plate 40. The connector assembly 46 and clamp assembly 48 can each have various designs, constructions, and components in different embodiments depending upon—among other possible factors—the design and construction of the associated paste hopper and that of the associated orifice plate. The figures present just one embodiment of many possible embodiments of the connector assembly 46 and clamp assembly 48.

As shown in FIGS. 3, 4, 6, and 7 the connector assembly 46 may be a pivotal assembly which may have at least one and, per an embodiment, multiple spaced-apart bars or pivot brackets 50 each attached to the downstream end of the orifice plate 40 by suitable fasteners such as machine screws 52 or bolts with heads recessed into the pivot brackets 50 with each bracket 50 having a semicircular surface or recess 54 which is complementary to, engageable with, disengageable from and pivotally rotatable or slideable on a cylindrical surface of a rod or shaft 58 carried by axially spaced-apart mounting brackets 60 attached to the paste hopper 18 by suitable fasteners such as machine screws threaded into the paste hopper 18. The semicircular surface 54 of the pivot brackets 50 may have an arcuate extent of not more than, and desirably per an embodiment slightly less than 180°, so that the pivot brackets 50 may be readily disengaged or removed from engagement with the shaft 58 to facilitate removal of the orifice plate 40 from the paste hopper 18. The semicircular surface 54 may have an arcuate extent of at least 90°.

The mounting brackets 60 are spaced apart so that, in assembly, the mounting brackets 60 may be disposed adjacent the ends of, and between, the pivot brackets 50. If desired, the pivot brackets 50 may be made as an integral part of the orifice plate 40. If desired, the pivot shaft 58 may be slidably received through bores through the mounting brackets 60 and retained therein such as by retaining rings 62 received in grooves adjacent the ends of the pivot shaft 58 and outboard of their associated adjacent mounting brackets 60. Other constructions for removeably connecting and disconnecting an end of the orifice plate 40 to the paste hopper 18 will occur to skilled artisans such as a finger or projection attached to, or integral with, one of the orifice plate 40 or paste hopper 18, and which is slideably receivable in a recess or pocket of a bracket attached to, or integral with, the other of the orifice plate 40 or paste hopper 18. The projection or recess or both may include a tapered surface which urges the orifice plate 40 into engagement with the paste hopper 18 as the projection is advanced into the recess or pocket.

Figure 4:
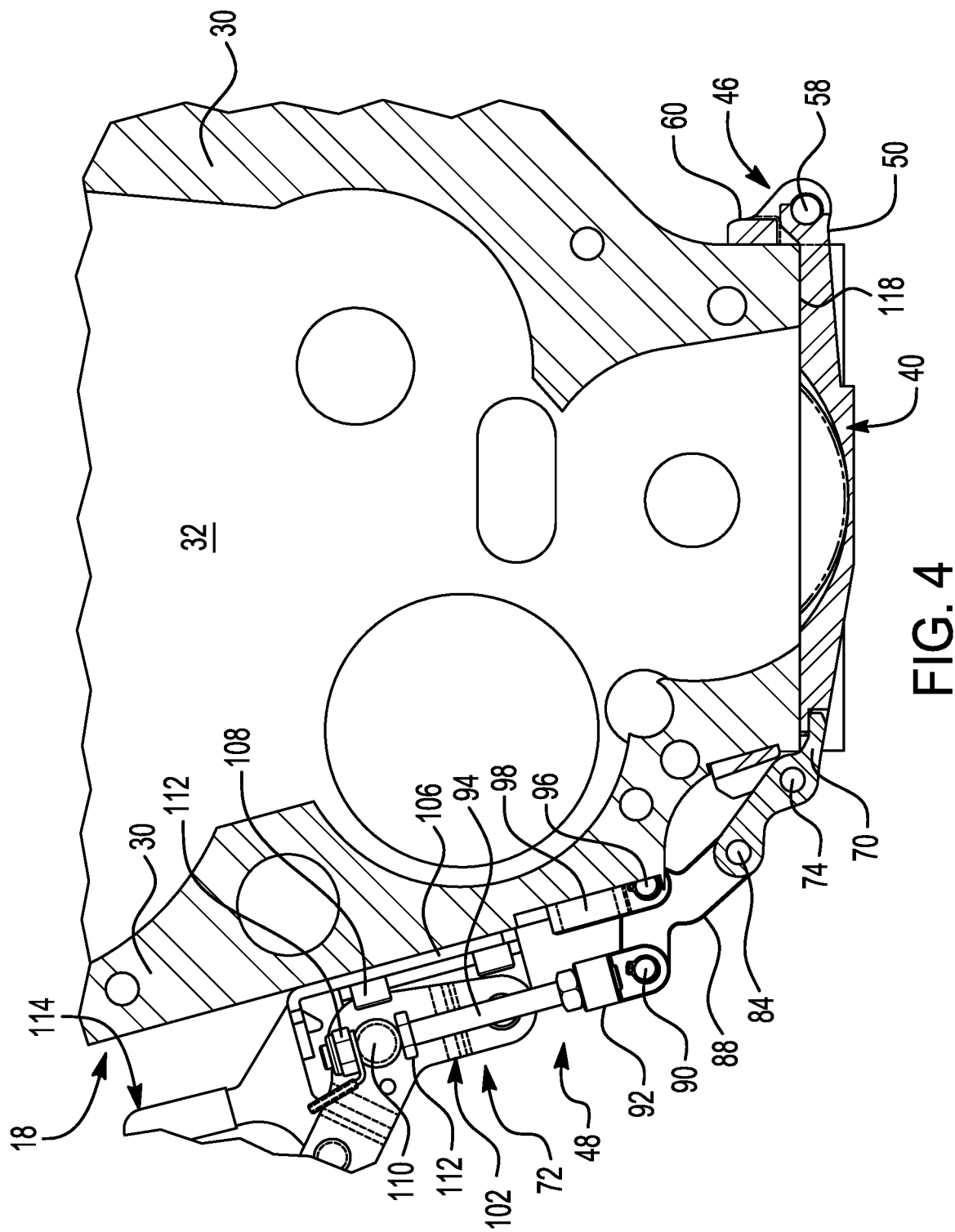
FIG. 4 is a fragmentary sectional view taken generally at line 4-4 of FIG. 2 showing the orifice plate releaseably and removeably secured to the paste hopper.
Figure 5:
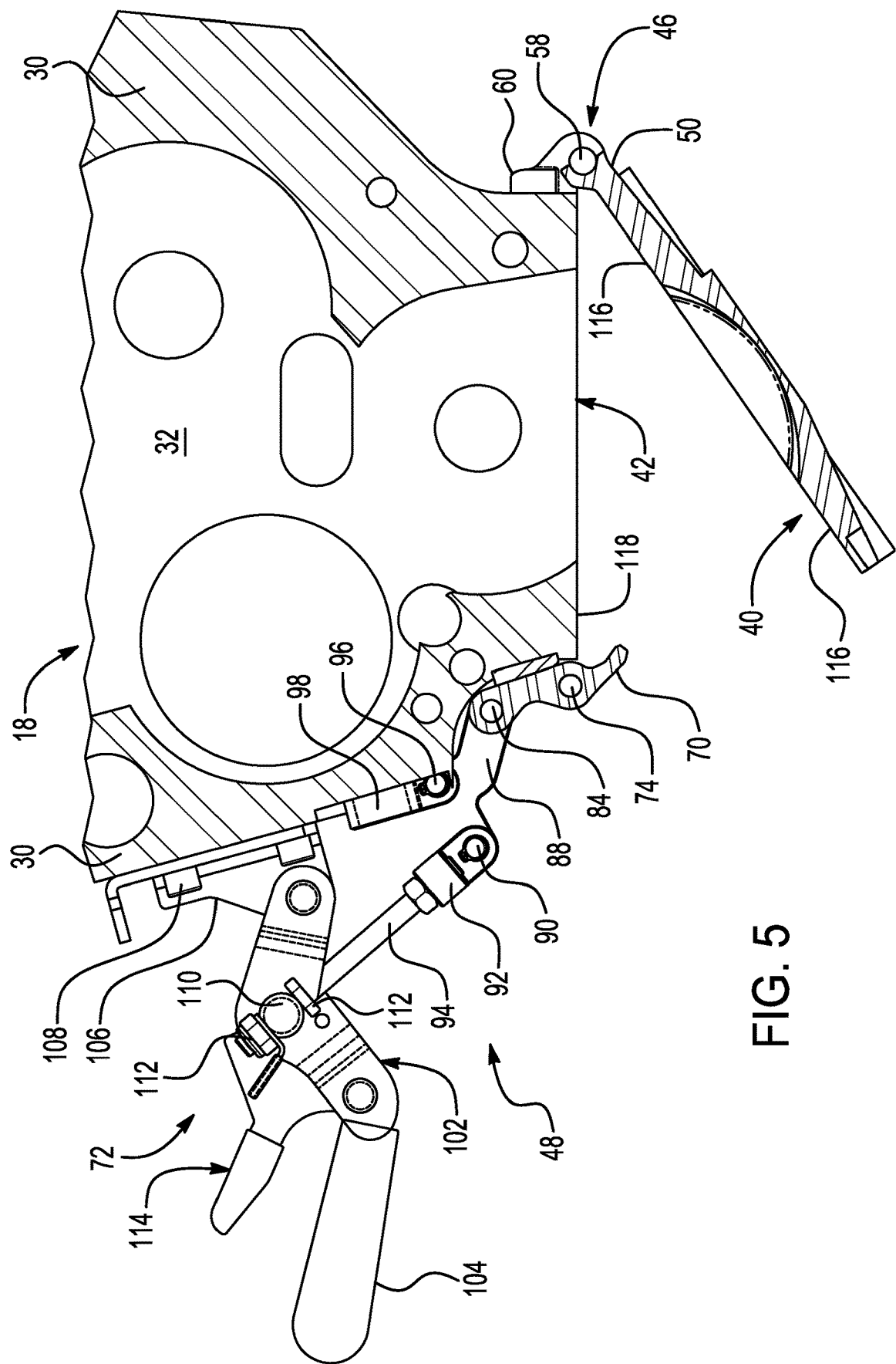
FIG. 5 is a fragmentary sectional view similar to FIG. 4 showing a clamp assembly disengaged from the orifice plate.
Figure 6:
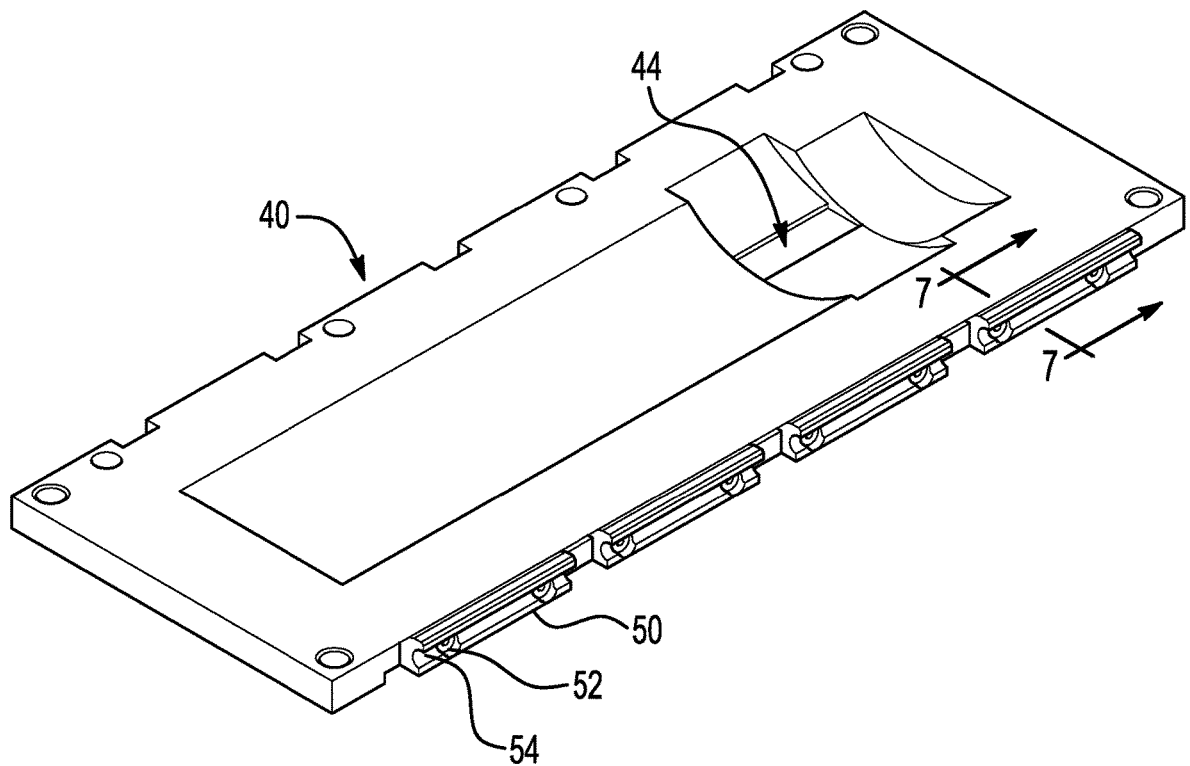
FIG. 6 is a perspective view of the orifice plate for the paste hopper.
Figure 7:
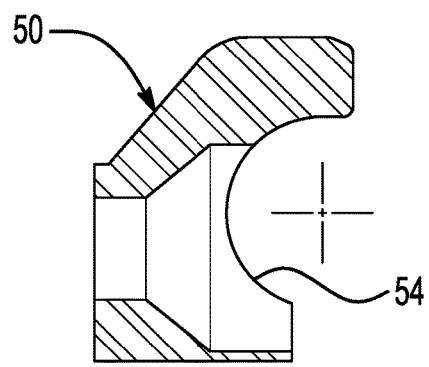
FIG. 7 is an enlarged fragmentary sectional view taken generally at line 7-7 of FIG. 6.

As shown in FIGS. 3-5, the clamp assembly 48 may have at least one and, desirably per an embodiment, a plurality of spaced-apart clamp fingers 70 pivotally movable to a first position shown in FIG. 4 engaging and clamping the orifice plate 40 to the paste hopper 18, and pivotally moveable to a second position shown in FIG. 5 disengaged from and releasing the orifice plate 40 so that the orifice plate 40 can be removed from the paste hopper 18. The clamp fingers 70 may be moved to their first and second positions by at least one and, desirably per an embodiment, at least two push-pull clamps 72 operably connected to the clamp fingers 70. As shown in FIGS. 2 and 3, each clamp finger 70 may be pivotally received on a cylindrical carrier shaft 74 and, desirably per an embodiment, received between a pair of tines or forks 76 of a yoke mounting bracket 78 attached to the paste hopper 18 by suitable fasteners such as machine cap screws 80. The carrier shaft 74 may be slidably received through coaxial bores through the tines 76 of the mounting brackets 78 and retained therein by snap rings 82 received in a groove adjacent each end of the carrier shaft 74 and disposed outboard of an adjacent tine 76. The clamp fingers 70 may also be connected to a connector shaft 84 received through a bore through each clamp finger 70, spaced from the carrier shaft 74 and adjacent the other end of each clamp finger 70 and retained therein such as by snap rings 86 received in a groove adjacent each end of the connector shaft 84 and disposed outboard of an adjacent clamp finger 70. If desired, the connector shaft 84 may be rotatable with respect to the clamp fingers 70.

Figure 8:
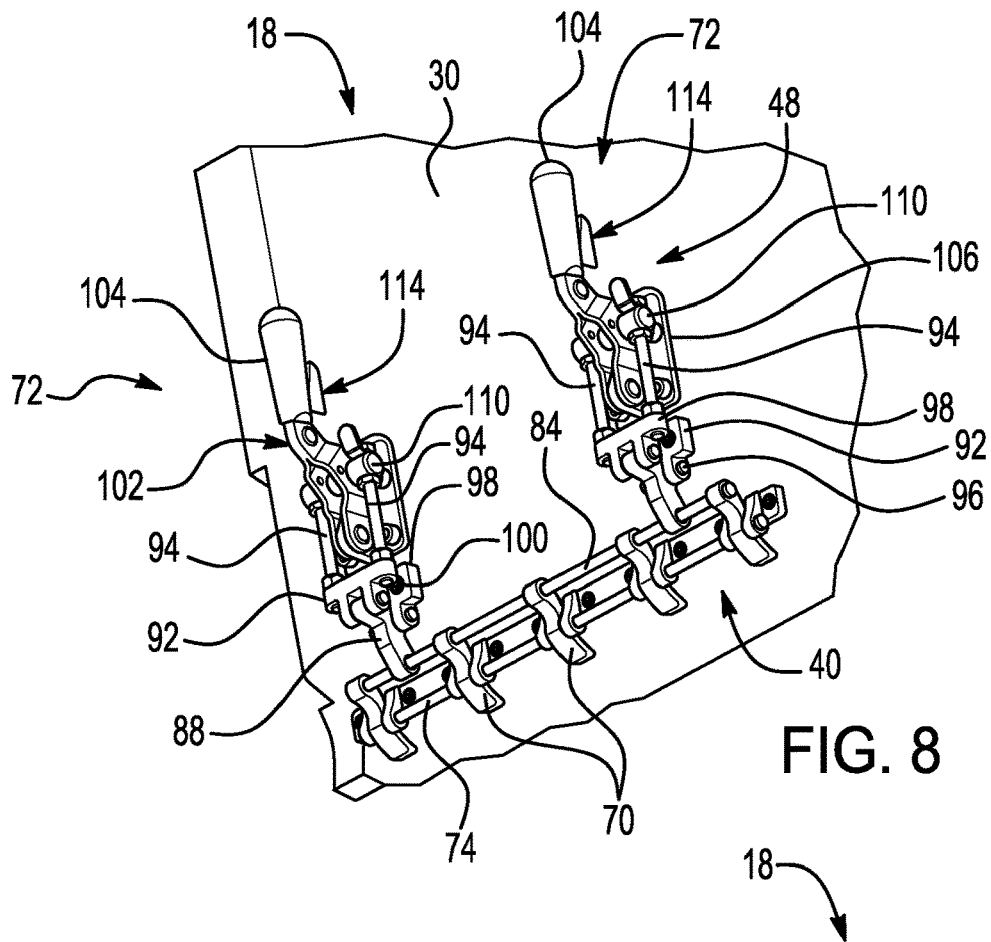
FIG. 8 is a perspective view of the clamp assembly carried by the paste hopper.
Figure 9:
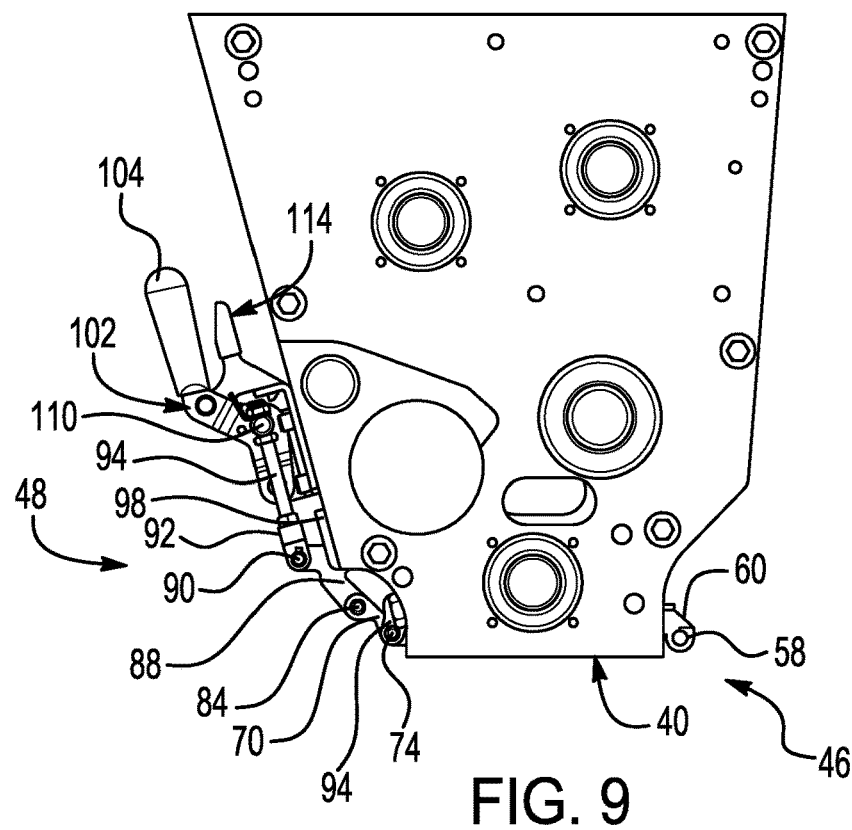
FIG. 9 is a side view of the clamp assembly of FIG. 8 carried by the paste hopper.

As shown in FIGS. 2 and 8, each push-pull clamp 72 is operably connected with the connector shaft 84 by a link 88 pivotally connected adjacent one end with the connector shaft 84, received through a bore through the link 88 and adjacent its other end pivotally connected by a pin 90 with a clamp bracket 92 to which each of a pair of rods 94 is attached. Between its ends, each link 88 is pivotally connected by a pin 96 to a mounting bracket 98 attached to the paste hopper 18 by fasteners such as machine cap screws 100. Each rod 94 adjacent one end may be threadably attached to an associated clamp bracket 92 and adjacent the other end to its associated push-pull clamp 72.

Each push-pull clamp 72 may have a lever 102 with a handle portion 104 adjacent one end and adjacent the other end be pivotally connected to a base bracket 106 attached to the paste hopper 18 by suitable fasteners such as machine cap screws 108. The base brackets 106 are attached to one of the walls 30 of the paste hopper 18. Between its ends the lever 102 may be pivotally connected by a pin 110 to each of an associated pair of the rods 94 received through a bore through the pin 110. The effective axial length of each rod 94 may be adjustable by nuts 112 threaded on the rod 94 and, in assembly, bearing on opposed sides of the pin 110. Each push-pull clamp 72 may include a latch lever 114 pivotally carried by the handle lever 102 and releaseably engageable with the base bracket 106 to releaseably retain the push-pull clamp 72 in its closed first position. In an example, suitable clamps are commercially available as model number 51335A68 from McMaster-Carr of Aurora, Ohio USA; still, other clamp products from other companies are possible in other examples.

In use, an orifice plate 40 may be installed on the paste hopper 18 by pivotally moving the paste hopper 18 to a position providing access to the bottom thereof, moving both push-pull clamps 72 to their open, second position and thus the clamp fingers 70 to the position shown in FIG. 5, engaging the pivot brackets or bars 50 on the orifice plate 40 with the shaft 58 carried by the paste hopper 18, moving an upper face 116 of the orifice plate 40 into engagement with a complementary bottom surface 118 of the paste hopper 18 as shown in FIG. 4, and moving both push-pull clamps 72 to their closed first position to move the clamp fingers 70 into firm engagement with the orifice plate 40 and secure the orifice plate 40 to the paste hopper 18. The paste hopper 18 may then be moved to its operating position for discharging battery paste material through the orifice 44 of the orifice plate 40 and onto a strip of battery grids as the strip is advanced relative to the orifice plate 40 and relative to the paste hopper 18. As will be apparent to skilled persons, the orifice plate 40 may be disengaged and removed from the paste hopper 18 by generally reversing these steps for installing and securing the orifice plate 40 on the paste hopper 18.

As used herein, the terms "general" and "generally" are intended to account for the inherent degree of variance and imprecision that is often attributed to, and often accompanies, any design and manufacturing process, including engineering tolerances—and without deviation from the relevant functionality and outcome—such that mathematical precision and exactitude is not implied and, in some instances, is not possible. In other instances, the terms "general" and "generally" are intended to represent the inherent degree of uncertainty that is often attributed to any quantitative comparison, value, and measurement calculation, or other representation.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A battery paste application tooling assembly, comprising;
   a hopper for receipt of battery paste material, the hopper having an orifice plate with an orifice for dispensing the battery paste material from the hopper;
   a connector at least in part carried by the hopper, the connector engageable with the orifice plate and disengageable from the orifice plate, the connector having at least one shaft and at least one bracket engageable with and rotatable about the at least one shaft and disengageable from the at least one shaft; and
   a clamp at least in part carried by the hopper, the clamp movable to a first position releaseably securing the orifice plate in engagement with the hopper and the connector, and the clamp movable to a second position permitting disengagement and removal of the orifice plate from the clamp, connector, and hopper, the clamp having at least one finger urging the orifice plate into engagement with the connector and with the hopper when the clamp is in the first position and disengaged from the orifice plate when the clamp is in the second position.

2. The battery paste application tooling assembly as set forth in claim 1, wherein one of the at least one shaft or bracket is carried by the hopper and the other is carried by the orifice plate.

3. The battery paste application tooling assembly as set forth in claim 1, wherein the at least one bracket has a semicircular surface with an arcuate extent of not more than 180° engageable with the at least one shaft.

4. The battery paste application tooling assembly as set forth in claim 1, wherein the at least one bracket has a semicircular surface with an arcuate extent of more than 90° and not more than 180° engageable with the at least one shaft.

5. The battery paste application tooling assembly as set forth in claim 1, wherein the at least one finger is pivotally carried by the hopper and urges the orifice plate into engagement with the connector and with the hopper when the clamp is in the first position and disengaged from the orifice plate when the clamp is in the second position.

6. The battery paste application tooling assembly as set forth in claim 1, wherein the clamp is carried by the hopper and manually movable to the first position and to the second position, at least one finger pivotally carried by the hopper, operably connected to the clamp, urging the orifice plate into engagement with the connector and the hopper when the clamp is in the first position and disengaged from the orifice plate when the clamp is in the second position.

7. The battery paste application tooling assembly as set forth in claim 1, wherein the clamp comprises at least a first clamp and a second clamp each carried by the hopper and each manually movable to the first position and the second position, a first finger associated with the first clamp and a second finger associated with the second clamp, each first and second finger pivotally carried by the hopper, operably connected to its respective clamp, urging the orifice plate into engagement with the connector and the hopper when its respective clamp is in the first position and disengaged from the orifice plate when its respective clamp is in the second position.

8. The battery paste application tooling assembly as set forth in claim 1, wherein the clamp is carried by the hopper and manually movable to the first position and the second position, a finger pivotally carried by the hopper, a link pivotally carried by the hopper, pivotally connected to the finger and operably connected to the clamp, the finger urging the orifice plate into engagement with the connector and the hopper when the clamp is in the first position and disengaged from the orifice plate when the clamp is in the second position.

9. The battery paste application tooling assembly as set forth in claim 8, wherein the clamp comprises a lever manually movable to the first position and the second position and operably connected to the link.

10. The battery paste application tooling assembly as set forth in claim 8, wherein the clamp comprises a clamp lever manually movable to the first position and the second position and operably connected to the link, and comprises a latch lever manually movable to a first position to releaseably retain the clamp lever in its first position and movable to a second position to release the clamp lever so that the clamp lever can be moved to its second position.

11. The battery paste application tooling assembly as set forth in claim 1, wherein the clamp comprises a clamp lever pivotally movable to the first position and the second position, and comprises a latch lever movable to a first position to releaseably retain the clamp lever in its first position and to a second position to release the clamp lever for movement to its second position.

12. The battery paste application tooling assembly as set forth in claim 1, wherein the connector comprises at least one bar and at least two spaced-apart brackets removeably engageable with the at least one bar and one of the at least one bar or the brackets is carried by the hopper and the other is carried by the orifice plate.

13. The battery paste application tooling assembly as set forth in claim 1, which comprises at least two orifice plates each having a different orifice configuration, size or location and each being compatible for use with the hopper.

14. The battery paste application tooling assembly as set forth in claim 1, wherein the at least one bracket has a surface engageable with and disengageable from the at least one shaft and pivotally movable when engaged with the at least one shaft, and the at least one shaft is carried by one of the hopper or the orifice plate and the at least one bracket is carried by the other of the hopper or the orifice plate.

15. A pasting machine comprising the battery paste application tooling assembly as set forth in claim 1.

* * * * *